US012795543B2

(12) United States Patent
Abotabl et al.

(10) Patent No.: US 12,795,543 B2
(45) Date of Patent: Nov. 10, 2026

(54) ADAPTIVE PROCESSING OF SCHEDULING REQUEST (SR) AS A WAKE-UP SIGNAL (WUS)

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US); Konstantinos Dimou, New York City, NY (US)

(73) Assignee: QUALCOMM Incorporated, San Diego, CA (US)

( * ) Notice: Subject to any disclaimer, the term of this patent is extended or adjusted under 35 U.S.C. 154(b) by 847 days.

(21) Appl. No.: 18/186,080

(22) Filed: Mar. 17, 2023

(65) Prior Publication Data

US 2024/0314691 A1 Sep. 19, 2024

(51) Int. Cl.
*H04W 52/02* (2009.01)
*H04W 48/08* (2009.01)
*H04W 72/12* (2023.01)
*H04W 72/21* (2023.01)

(52) U.S. Cl.
CPC ....... *H04W 52/0235* (2013.01); *H04W 48/08* (2013.01); *H04W 72/12* (2013.01); *H04W 72/21* (2023.01)

(58) Field of Classification Search
CPC . H04W 52/0235; H04W 72/21; H04W 72/12; H04W 48/08
USPC ........................................................ 370/311
See application file for complete search history.

(56) References Cited

U.S. PATENT DOCUMENTS

2017/0013610 A1* 1/2017 Lee ...................... H04W 72/21
2021/0051767 A1 2/2021 Zhang et al.
2024/0098636 A1* 3/2024 Babaei ............. H04W 52/0212
2024/0389017 A1 11/2024 Elshafie et al.

FOREIGN PATENT DOCUMENTS

WO WO-2022155958 A1 7/2022

OTHER PUBLICATIONS

International Search Report and Written Opinion—PCT/US2024/013346—ISA/EPO—Jun. 11, 2024 (2300934WO).
Samsung: "Network Energy Saving Techniques", 3GPP TSG'RAN WG1 #110, R1-2206839, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 15 Pages, XP052274776, The Whole Document.

* cited by examiner

*Primary Examiner* — Chi Tang P Cheng
(74) *Attorney, Agent, or Firm* — Norton Rose Fulbright US LLP

(57) ABSTRACT

This disclosure provides systems, methods, and devices for wireless communication that support adaptive processing of a scheduling request (SR). In a first aspect, a method of wireless communication includes generating an SR that includes an indicator associated with processing of the SR as a wake-up signal (WUS) and transmitting the SR to a network entity. Other aspects and features are also claimed and described.

29 Claims, 8 Drawing Sheets

664

602 604 608

| Network State | SR Codebook | Meaning |
| --- | --- | --- |
| Legacy | 1/0 | UE has data / UE doesn't have data |
| Inactive State | 1/0 | UE requesting network to active state |
| SIB1-less State | 1/0 | Requesting network to transmit SIB1 |

FIGURE 6

ADAPTIVE PROCESSING OF SCHEDULING REQUEST (SR) AS A WAKE-UP SIGNAL (WUS)

TECHNICAL FIELD

Aspects of the present disclosure relate generally to wireless communication systems, and more particularly, to a scheduling request (SR), such as an SR that includes an indicator associated with processing of the SR as a wake-up-signal (WUS). Some features may enable and provide enhanced energy efficiency and reduced control overhead.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Energy consumption may be a significant operating expense associated with a communication network. For example, energy expenses may constitute approximately a quarter of the total operating expenses associated with operating a communication network. Additionally, approximately half of the energy expended by a communication network may be attributable to operating a radio access network (RAN). Accordingly, to conserve energy, components of a communication network, such as one or more network entities, may be configured to operate in different network energy saving (NES) states. In some implementations, an NES state may depend on a quantity of network traffic. For example, when there exists a large volume of network traffic, the communication network may operates in a first NES state corresponding to high energy usage. Conversely, when there exists a reduced volume of network traffic, the communication network may operates in a second NES state corresponding to low energy usage. However, components of a communication network, such as a network entity, may be unaware of when the communication network is configured to operate in the first NES state (e.g., a high energy state) or the second NES state (e.g., the low energy state). Additionally, a network entity may be unaware of when a user equipment (UE) is likely to communicate with the network entity, thereby requiring the network entity to be maintain or frequently be in an active state, such as a high energy state. By maintaining or frequently being in the active state, energy may unnecessarily be expended when there is actually a low volume of network traffic. Alternatively, setting the network entity to a low energy state, such as an inactive or sleep state, may degrade overall communication quality, especially when a UE has a need to communication with the network entity. Moreover, transitioning from a low energy state to a high energy state, and vice versa, may result in communication delay based on a ramp-up time or a ramp-down time.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes generating a scheduling request (SR) that includes an indicator associated with processing of the SR as a wake-up signal (WUS). The method also includes transmitting the SR to a network entity.

In an additional aspect of the disclosure, an apparatus includes at least one processor and a memory coupled to the at least one processor. The at least one processor is configured to generate an SR that includes an indicator associated with processing of the SR as a WUS. The at least one processor is further configured to transmit the SR to a network entity.

In an additional aspect of the disclosure, an apparatus includes at least one processor coupled to a memory storing processor-readable code. The at least one processor is configured to execute the processor-readable code to cause the at least one processor to generate a scheduling request (SR) that includes an indicator associated with processing of the SR as a wake-up signal (WUS). The apparatus further includes a communication interface configured to transmit the SR to a network entity.

In an additional aspect of the disclosure, an apparatus includes means for generating an SR that includes an indicator associated with processing of the SR as a WUS. The apparatus further includes means for transmitting the SR to a network entity.

In an additional aspect of the disclosure, a non-transitory computer-readable medium stores instructions that, when executed by a processor, cause the processor to perform operations. The operations include generating an SR that includes an indicator associated with processing of the SR as a WUS. The operations further include transmitting the SR to a network entity.

In one aspect of the disclosure, a method for wireless communication is performed by a base station. The method includes receiving an SR that includes an indicator associated with processing of the SR as a WUS. The method further includes, in response to receipt of the SR, setting a network energy saving (NES) state associated with the network entity based on the SR.

In an additional aspect of the disclosure, an apparatus includes at least one processor and a memory coupled to the at least one processor. The at least one processor is configured to receive an SR that includes an indicator associated with processing of the SR as a WUS. The at least one processor is further configured to, in response to receipt of the SR, set a NES state associated with the network entity based on the SR.

In an additional aspect of the disclosure, an apparatus includes a communication interface configured to receive an SR that includes an indicator associated with processing of the SR as a WUS. The apparatus further includes at least one processor coupled to a memory storing processor-readable code. The at least one processor is configured to execute the processor-readable code to cause the at least one processor to, in response to receipt of the SR, set a NES state associated with the network entity based on the SR.

In an additional aspect of the disclosure, an apparatus includes means for receiving an SR that includes an indicator associated with processing of the SR as a WUS. The apparatus further includes means for, in response to receipt of the SR, setting a NES state associated with the network entity based on the SR.

In an additional aspect of the disclosure, a non-transitory computer-readable medium stores instructions that, when executed by a processor, cause the processor to perform operations. The operations include receiving an SR that includes an indicator associated with processing of the SR as a WUS. The operations further include, in response to receipt of the SR, setting a NES state associated with the network entity based on the SR.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating an example of adaptive processing of an SR as a WUS according to one or more aspects.

Like reference numbers and designations in the various drawings indicate like elements.

DETAILED DESCRIPTION

Figure 1:
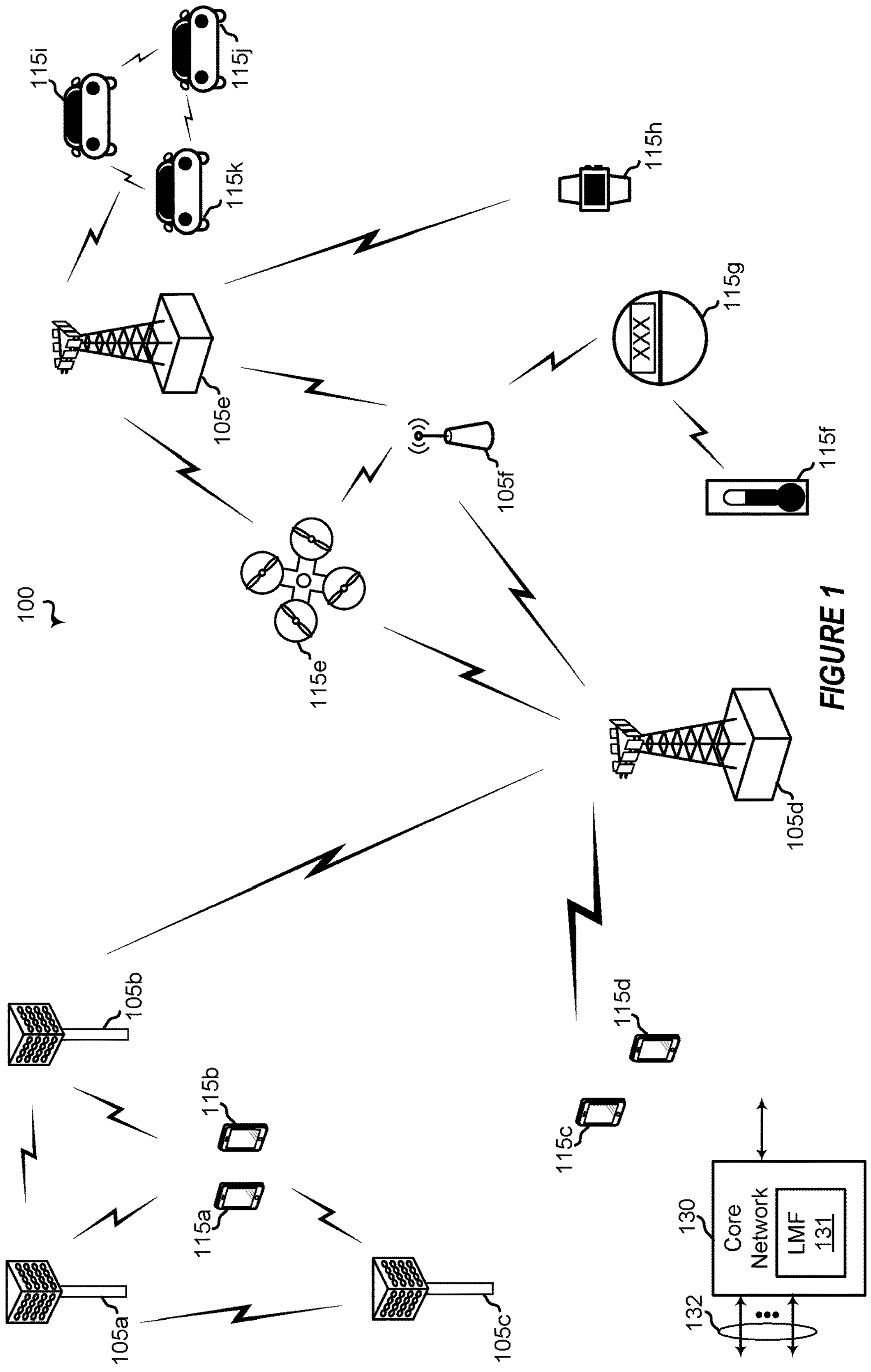
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support adaptive processing of a scheduling request (SR) as a wake-up signal (WUS). For example, the present disclosure describes generating an SR that includes an indicator associated with processing of the SR as a WUS. To illustrate, a user equipment (UE) may generate the SR and transmit the SR to a network entity. The SR may indicate a request for the network entity to change a network energy saving (NES) state, a request for the network entity to transmit a synchronization signal block (SSB), a request for the network entity to transmit a system information block type 1 (SIB1), an uplink (UL) resource grant request from the network entity, or a combination thereof. The SR may be configured to be processed based on or as a function of a state of the network entity, such as an NES state of the network entity. Additionally, or alternatively, the SR may be configured to be processed based on or as function of a time slot or occasion (e.g., a physical uplink control channel (PUCCH) occasion) during which the SR is transmitted.

Particular implementations of the subject matter described in this disclosure may be implemented to realize one or more of the following potential advantages or benefits. In some aspects, the present disclosure provides techniques for supporting adaptive processing of an SR as a WUS. Processing of an SR as a WUS may correspond to, or include, interpreting the SR as a WUS. The techniques described enhance an energy efficiency of a wireless communications network while conserving computational resources and maintaining communication quality. Configuring an existing signal, such as an SR, so that it is processed (e.g., interpreted) as a WUS reduces computational overhead by obviating the need to introduce new signaling protocols. Additionally, or alternatively, since the SR is configured to be processed as a WUS by a network entity, improved energy efficiency is achieved by selectively switching a state of the network entity, such as an NES state, based on demand for communication resources presented by one or more UEs. In this manner, communication quality is not sacrificed to energy efficiency, since the components of the wireless communications system, such as the network entity, may be toggled into high energy states based on demand from UEs as denoted by transmission of an SR that includes an indicator associated with processing of the SR as a WUS.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHZ bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*c*.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
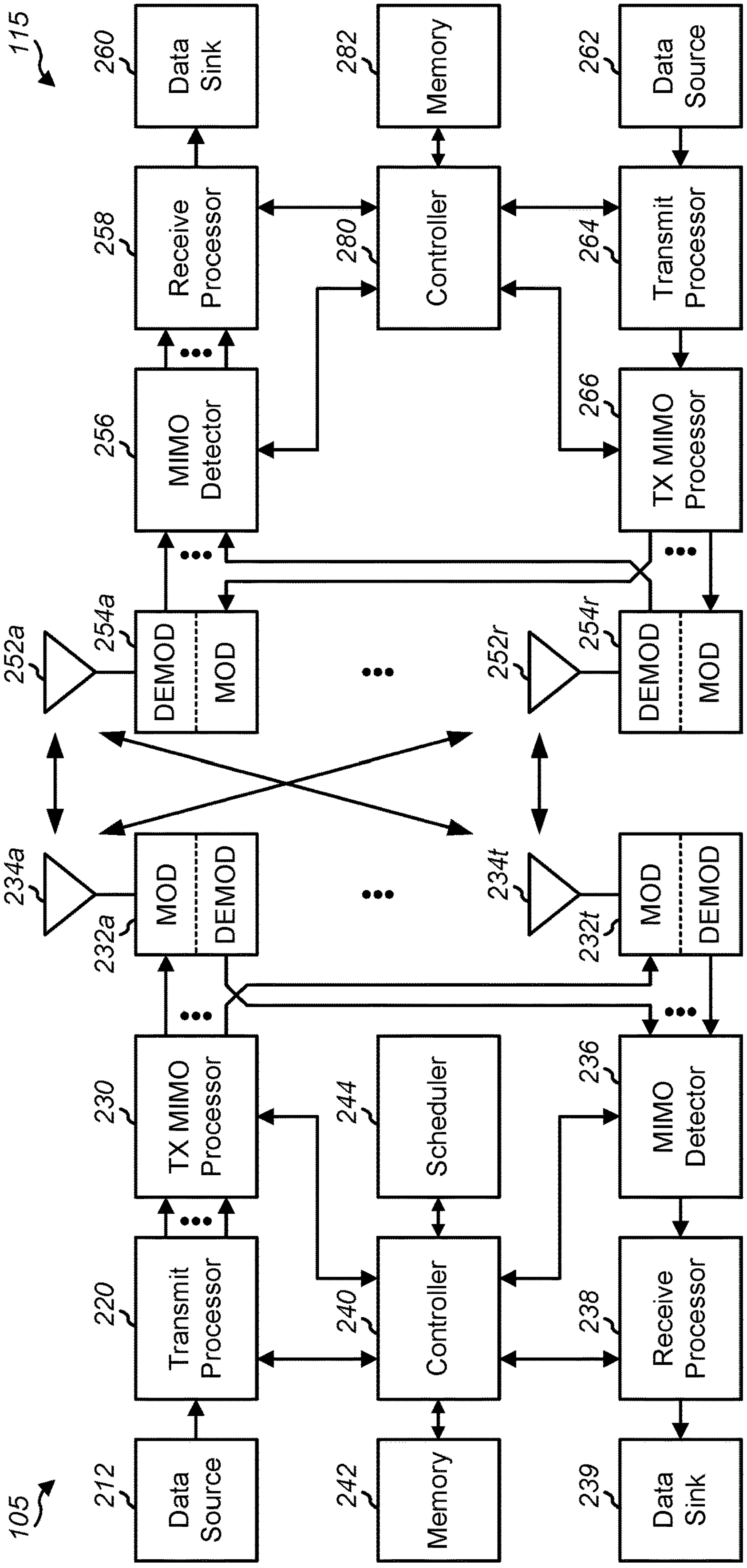
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
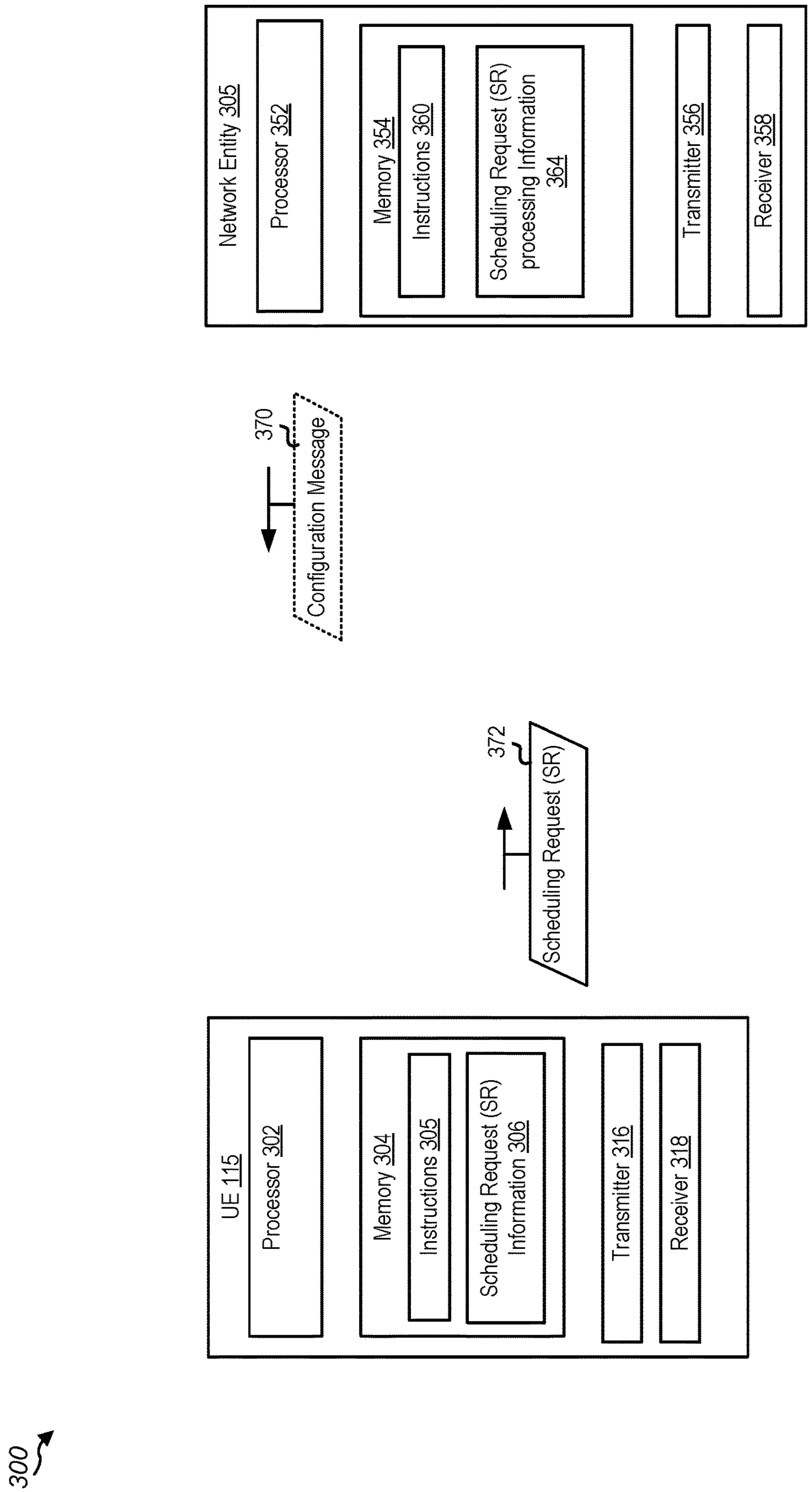
FIG. 3 is a block diagram illustrating an example wireless communication system that supports adaptive processing of a scheduling request (SR) as a wake-up signal (WUS) according to one or more aspects.

FIG. 3 is a block diagram of an example wireless communications system 300 that supports adaptive processing of an SR as a WUS according to one or more aspects. In some examples, wireless communications system 300 may implement aspects of wireless network 100. Wireless communications system 300 includes UE 115 and network entity 305. Although one UE 115 and one network entity 305 are illustrated, in some other implementations, wireless communications system 300 may generally include multiple UEs 115, multiple network entities 305, or a combination thereof. It is understood that network entity 305 may include or correspond to base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, UE 115 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 305 and SR information 306. SR information 306 may include or correspond to an SR codebook associating SR 372 with a state of one or more components of wireless communications system 300, such as a state of network entity 305, and processing of the SR based on the state. The state may correspond to a network state, such as a NES state, other operating state of the network component (e.g., network entity 305), or a combination thereof.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally, or alternatively, transmitter 316 or receiver 318 may include or correspond to one or more components of UE 115 described with reference to FIG. 2.

In some implementations, UE 115 may include one or more antenna arrays. The one or more antenna arrays may be coupled to transmitter 316, receiver 318, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include transmit (TX) beams and receive (RX) beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

Network entity 305 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). In some implementations, base station 105 may include an interface (e.g., a communication interface) that includes transmitter 356, receiver 358, or a combination thereof. Processor 352 may be configured to execute instructions 360 stored in memory 354 to perform the operations described herein. In some implementations, processor 352 includes or corresponds to one or more of receive processor 238, transmit processor 220, and controller 240, and memory 354 includes or corresponds to memory 242. Network entity 305 may include or correspond to base station 105.

Memory 354 includes or is configured to store instructions 360, SR processing information 364, and NES state information 366. SR processing information 364 is configured to be use to process an SR (e.g., 372). An example (e.g., a data structure) of SR processing information 364 is described further herein at least with reference to FIG. 6. NES state information 366 may include or indicate a state of a network or of network entity 305. For example, NES state information may include or indicate a low energy NES state (e.g., an inactive state) or a high energy NES state (e.g., an active state). In some implementations, examples of low energy NES states may include a "light sleep" state and a "deep sleep state." The deep sleep state may differ from the light sleep state in using less energy than a light sleep state and necessitating more time for a transition from that state to another state (e.g., to transition from the deep sleep state to another state).

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, network entity 305 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 300 implements a 5G NR network. For example, wireless communications system 300 may include multiple 5G-capable UEs 115 and multiple 5G-capable network entities 305, such as UEs and network entities configured to operate in accordance with a 5G NR network protocol such as that defined by the 3GPP. In some other implementations, wireless communications system 300 implements a 6G network.

During operation of wireless communications system 300, UE 115 may generate SR 372 that includes an indicator associated with processing of SR 372 as a WUS. UE 115 may transmit SR 372 to network entity 305. In response to receipt of SR 372, network entity 305 may change a NES state associated with network entity 305.

In some implementations, processor 302 of UE 115 may generate SR 372 based on SR information 306 stored in memory 304. SR information 306 may include or correspond to an SR codebook associating SR 372 with a state of one or more components of wireless communications system 300, such as a state of network entity 305, and associated processing of the SR based on the state. The state may correspond to a network state, such as a NES state, other operating state of the network component (e.g., network entity 305), or a combination thereof.

In some implementations, SR 372 is configured to be processed based on an NES state of network entity 305. To illustrate, in response to receipt of SR 372 by network entity 305, processor 352 may access SR processing information 364 to process SR 372. For example, referring to FIG. 6, FIG. 6 is a block diagram illustrating an example of adaptive processing of an SR as a WUS according to one or more aspects. To illustrate, SR processing information 664 may include or correspond to SR processing information 364. SR processing information 664 may associate network state 602, SR codebook 604, and an interpretation 608 that corresponds to SR codebook 604 and network state 602. To illustrate, when network entity 305 is in a low energy NES state (e.g., an inactive state), network entity 305 may be configured to process SR 372 as a request, by UE 115, for network entity 305 to transition to a high energy NES state (e.g., an active state). Accordingly, SR 372 may be processed as a WUS by network entity 305. As another example, when network entity 305 is in an SIB-1 less state (e.g., is not transmitting SIB-1), network entity 305 may process SR 372 to be a request to transmit SIB-1. Alternatively, when network entity 305 is in a legacy operating state (e.g., a default operating state) and when a bit of SR 372 is set to "1," network entity 305 may process SR 372 as indicating that UE 115 has data to transmit. Conversely, when a bit of SR 372 is set to "0," network entity 305 may process SR 372 as indicating that UE 115 has no data to transmit.

Referring again to FIG. 1, in some implementations, SR 372 indicates a request for network entity 305 to change an NES state. Additionally, or alternatively, SR 372 indicates a request for an SSB, an SIB1 from network entity 305, aUL resource grant from network entity 305, or a combination thereof. In some implementations, the NES state is a low energy state corresponding to an inactive state or a high energy state corresponding to an active state.

While SR 372 may include a single bit or a plurality of bits. Each bit of the plurality of bits may indicate one of a request, by UE 115 to network entity 305, to switch from a low-energy NES state to a high-energy NES state or from a high-energy NES state to a low-energy NES state, to allocate a UL resource grant, to activate one or more component carriers (CCs). or any combination thereof. Additionally, a bit of the plurality of bits may indicate a request, by UE 115 to network entity 305, to initiate an SSB transmission, to initiate an SIB1 transmission, or a combination thereof. In some implementations, SR 372 may be configured to include a plurality of bits such that different bit combinations indicate different requests made by UE 115. For example, a first bit combination (e.g., 001) may indicate a request for network entity 305 to allocate UL resources to requesting UE 115. A second bit combination (e.g., 010) may indicate a request for network entity 305 to transition from a first NES state to a second NES state. UE 115 may be configured to generate the plurality of bits, constituting at least a portion of SR 372, by using different phase offsets of a same Zadoff-Chu (ZC) sequence. For instance, different cyclic shifts for each codepoint among a plurality of codepoints may be used.

In some implementations, network entity 305 may generate configuration message 370, indicating that SR 372 is configurable to be processed as the WUS. Network entity 305 may transmit configuration message 370. In response to receipt of configuration message 370, UE 115 may be configured to generate SR 372 based on configuration message 370. For example, configuration message 370 may include SR information 306 corresponding to instructions specifying how UE 115 is to generate SR 372 configurable to be processed as a WUS.

Components or devices of wireless communications network 300, such as network entity 305, may operate in different states, such as different NES states, depending on a volume and rate of network traffic that they handle. Examples of low energy NES states may include a "light sleep" state and a "deep sleep state." The deep sleep state may differ from the light sleep state in using less energy than a light sleep state and necessitating more time for a transition from that state to another state (e.g., to transition from the deep sleep state to another state).

Additionally, or alternatively, a volume and rate of network traffic may not be not evenly distributed over time. For instance, there may exist times of the day during which a volume and rate of network traffic are small, but network entity 305 still periodically transmits SSB, system information (SI), or both. Moreover, even during these periods of low network traffic volume and rate, network entity 305 may still periodically monitor physical random access channel (PRACH) occasions for possible random access channel (RACH), small data transmissions (SDTs) from UE 115, or combinations thereof. Accordingly, even during periods of low network traffic volume and rate, network entity 305 may usually be in a high energy NES state (e.g., an active mode), which consumes energy without providing an amount of serve this commensurate to energy consumption. To mitigate this wasteful energy consumption, network entity 305 may be configured to enter into a high energy NES state in response to identifying a UE (e.g., 115) necessitating service, such as a UE that has transitioned into a connected state or a UE that requires network resources to perform a SDT. Accordingly, a solution to the foregoing problem and to the problem of network energy wastage includes repurposing an existing signal, such as repurposing the SR, to serve as a WUS. Such a solution does not rely on an additional a signal, generated and transmitted by the UE, that is processed by the network device as a WUS. However, an additional signal would lead to additional computational overhead, thereby defeating any energy efficiency savings that might accrue. For instance, creating a new signal may necessitate implementing a new code book with its associated computational overhead.

Therefore, in some implementations SR 372 may be configured to be processed as a WUS. In some implementations, UE 115, network entity 305, or both may be configured such that SR 372 is processed as a WUS at specific instances of time (e.g., specific occasions), as explained further herein at least with reference to FIG. 4. In some implementations, network entity 305 may be configured to process SR 372 based on a state of network entity 305 when network entity 305 receives SR 372, as further described herein at least with reference to FIG. 5. In some implementations, SR 372 that is adapted to be processed as a WUS, may be configured based on a standard. Alternatively, SR 372 that is adapted to be processed as a WUS may be configured by or based on RRC signaling.

In some implementations, UE 115 may receive a configuration message to generate SR 372 configured to be processed as a WUS. In such an implementation, when UE 115 is in a connected mode, the configuration message may be transmitted via RRC, such as through PUCCH-Config or PUCCH-ConfigCommon. In some such implementations, when UE 115 is in an inactive or idle mode, the configuration message may be transmitted using an SIB1.

In some implementations, UE 115 may be configured to transmit SR 372 using various PUCCH formats, such as formats 1, 2, 3, or 4. Additionally, in some implementations, HARQ-ACK and SR 372 can be sent on a same channel (e.g., PUCCH) by multiplexing the bits using level 1 (L1), level 2 (L2), or level 3 (L3) signaling.

As described with reference to FIG. 3, the present disclosure provides techniques for supporting adaptive processing of an SR as a WUS. For example, UE 115 may generates SR 372 that includes an indicator associated with processing of the SR as a WUS. UE 115 may transmit SR 372 to network entity 305. In response to receipt of SR 372, network entity 305 is configured to set a NES state associated with network entity 305. Setting the NES state associated with network entity 305 may include changing, adjusting, and/or configuring the NES state. In some implementations, network entity 305 may process SR 372 based on a state of network entity 305 when network entity 305 receives or processes SR 372. For instance, SR 372 may indicate a request for network entity 305 to set an NES state, such as when the network is in an inactive or low energy NES state, or a request for network entity 305 to transmit SIB1, such as when network entity 305 is not transmitting SIB1. Additionally, or alternatively, SR 372 may indicate a UL resource grant request for network entity 305 to transmit or issue a UL resource grant. In some implementations, SR 372 may indicate a request for network entity 305 to transmit an SSB.

The techniques described reduce control overhead of wireless communications systems, while enhancing an energy efficiency of these systems. By repurposing an existing message, such as SR 372, to be used for a different purpose, such as including an indicator associated with processing of SR 372 as a WUS, computational resources of a wireless communications system are conserved, since new messaging protocols and their accompanying software, hardware, or firmware infrastructure are not needed. Additionally, by serving as a request for network entity 305 to switch an NES state, such as transitioning from a low energy state (e.g., a quiescent or inactive state) to a high energy state (e.g., an active state), an energy consumption of network entity 305 can vary as a function of demand for communication resources without sacrificing communication quality.

Figure 4:
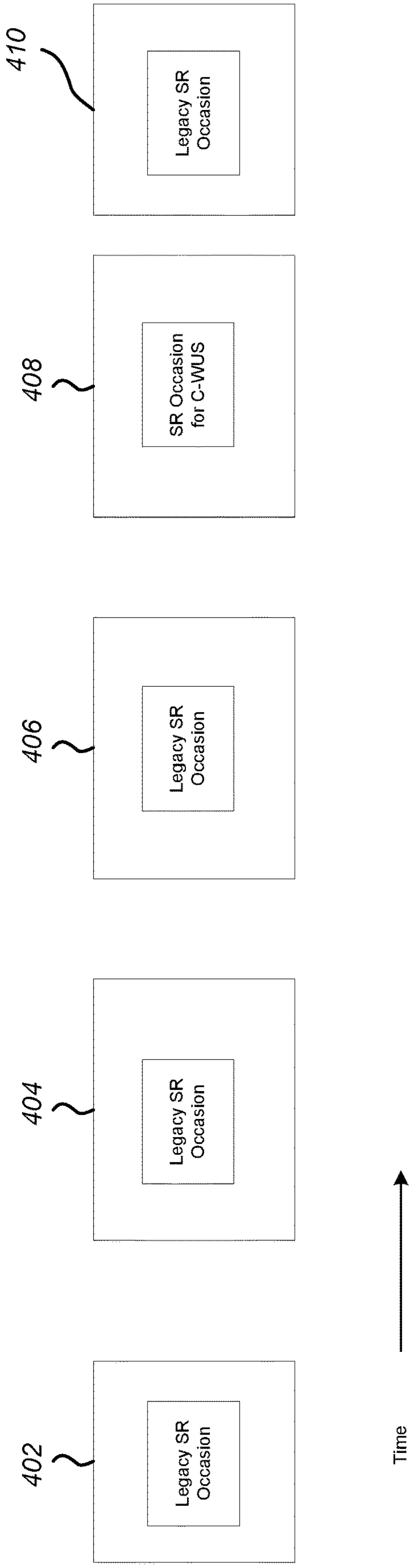
FIG. 4 is a block diagram illustrating an example of adaptive processing of an SR as a WUS according to one or more aspects.

FIG. 4 is a block diagram illustrating an example of adaptive processing of an SR as a WUS according to one or more aspects. In some implementations, transmitting an SR by a UE to a network entity includes transmitting a first PUCCH occasion that includes the SR. For example, transmitting SR 372 by UE 115 to network entity 305 may include transmitting a first PUCCH occasion that includes SR 372. Additionally, the UE may transmit multiple PUCCH occasions that including the first PUCCH occasion and a second PUCCH occasion. The second PUCCH occasion may include another SR that is configured to request a UL resource for transmission of data. The UE may be configured to periodically transmit the SR processable as a WUS in the same PUCCH occasion.

Referring to FIG. 4, multiple PUCCH occasions, such as a first PUCCH occasion 402, a second PUCCH occasion 404, a third PUCCH occasion 406, a fourth PUCCH occasion 408, and a fifth PUCCH occasion 410, are shown over a period of time. An SR (e.g., 372) is processed, by a network entity (e.g., 305), as a WUS based on a PUCCH occasion at which a UE (e.g., 115), transmits the SR. For example, the SR may be configurable such that, during every fourth PUCCH occasion (e.g., 408) in a sequence of PUCCH occasions, network entity processes an SR received during the PUCCH occasion as a WUS. During other PUCCH occasions, such as first PUCCH occasion 402, second PUCCH occasion 404, third PUCCH occasion 406, and fifth PUCCH occasion 410, the network entity is configured to process the SR as something other than a WUS. For instance, the network entity may process the SR transmitted during first PUCCH occasion 402, as a request for allocation of UL resources, while the network entity may process the SR transmitted during the fifth PUCCH occasion 410 as a request for the network entity to transmit SIB1. The SR processed as a WUS may be transmitted periodically so that, during every fourth PUCCH occasion, the network entity is configured to process the SR transmitted during that PUCCH occasion as a WUS. Although described as every fourth PUCCH occasion, the SR may be processed as a WUS every PUCCH occasion, every other PUCCH occasion, every third PUCCH occasion, every fifth PUCCH occasion, etc. Additionally, or alternatively, the SR may be processed as a WUS according to or based on a pattern or other sequence.

Figure 5:
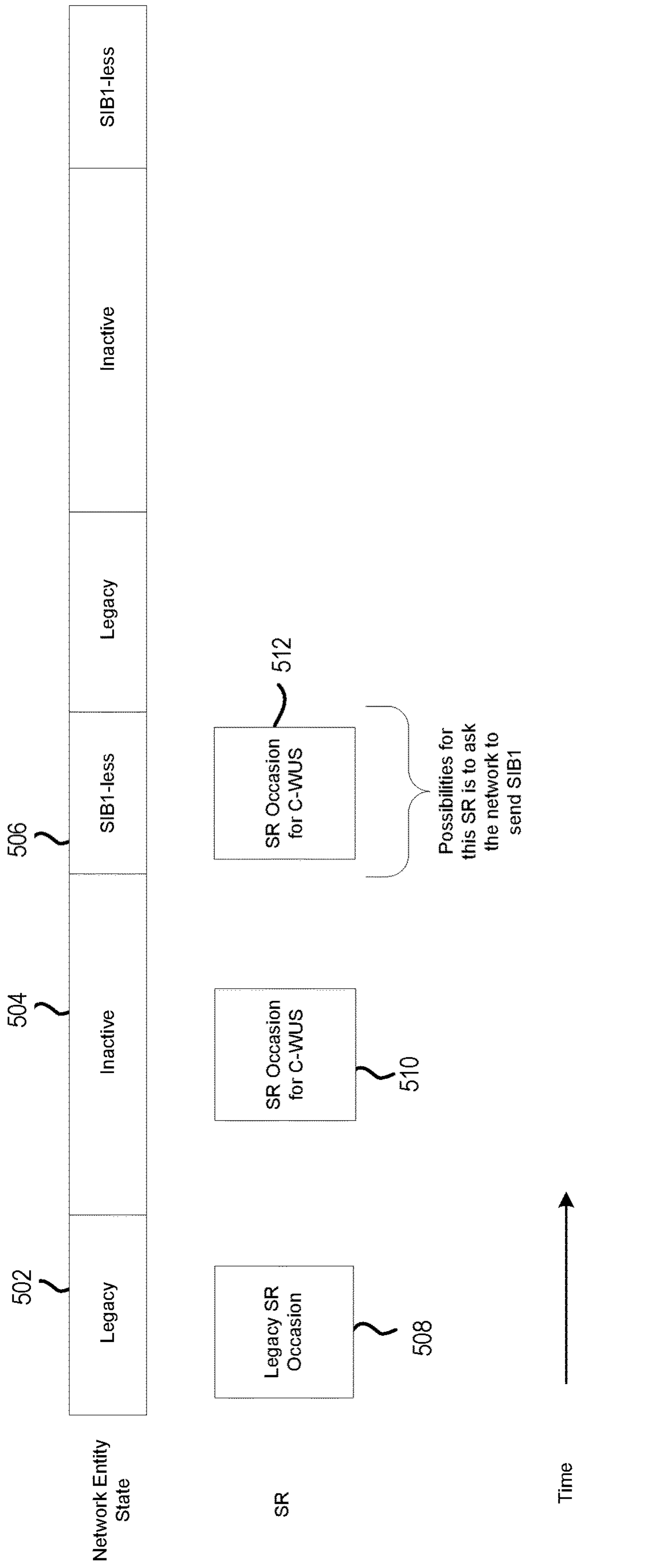
FIG. 5 is a block diagram illustrating an example of adaptive processing of an SR as a WUS according to one or more aspects.

FIG. 5 is a block diagram illustrating an example of adaptive processing of an SR as a WUS according to one or more aspects. In some implementations, the SR, such as SR 372, is configured to be processed based on a state of one or more components of a wireless communications system, such as based on a state of a network entity. To illustrate, a network entity, such as network entity 305, may enter into legacy state 502, inactive state 504, SB-1 less state 506, or combinations thereof. In response to receiving SR 508 while in legacy state 502, the network entity may be configured to process SR 508 as a request for allocation of network resources to the transmitting UE (e.g., the UE that transmitted SR 508 to the network entity). As another example, in response to receiving SR 510 while being in an inactive or low energy NES state, the network entity may be configured to process SR 510 as a WUS and, may consequently, transition from the low energy NES state to a high energy NES state (e.g., an active state). Moreover, in response to receiving SR 512 while being in an SIB1-less state, the network entity may be configured to process SR 512 as a request by the transmitting UE (e.g., the UE that transmitted SR 512) to transmit SIB-1.

Figure 7:
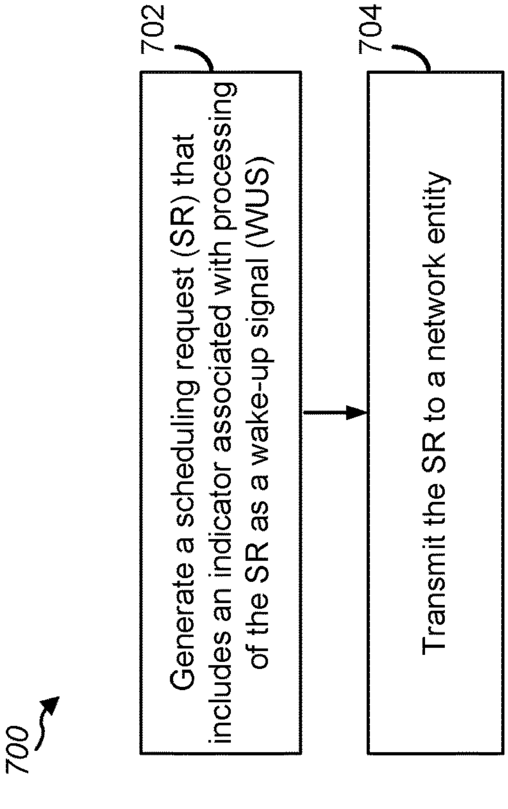
FIG. 7 is a flow diagram illustrating an example process that supports adaptive processing of an SR as a WUS according to one or more aspects.

Referring to FIG. 7, FIG. 7 is a flow diagram illustrating an example process 700 that supports adaptive processing of an SR as a WUS according to one or more aspects. Operations of process 700 may be performed by a UE, such as UE 115 described above with reference to FIGS. 1-3 or a UE described with reference to FIG. 8. For example, example operations (also referred to as "blocks") of process 700 may enable UE 115 to support adaptive processing of an SR as a WUS.

In block 702, the UE generates a scheduling request (SR) that includes an indicator associated with processing of the SR as a WUS. The SR may include or correspond to SR 372.

In block 704, the UE transmits the SR to a network entity. For example, the network entity may include or correspond to network entity 305. In implementations, a processor of the UE may transmit the SR to the network entity by, for example, causing a communication interface that is communicatively coupled to the processor to transmit the SR.

In some implementations, the SR indicates a request for the network entity to change an NES state, a request for the network entity to transmit an SSB, a request for the network entity to transmit SIB1, a UL resource grant request from the network entity, or a combination thereof. Additionally, the NES state may be a low energy state corresponding to an inactive state or a high energy state corresponding to an active state. Additionally, the UE configured to transmit the SR to the network entity may include the UE further configured to transmit a first PUCCH occasion that includes the SR. Moreover, the UE may further be configured to transmit multiple PUCCH occasions, the multiple PUCCH occasions including the first PUCCH occasion and a second PUCCH occasion. The second PUCCH occasion may include another SR (e.g., a second SR in addition to the SR) that is configured to request a UL resource for transmission of data. Further, the SR transmitted in the first PUCCH occasion may include transmission of the SR periodically as explained with reference to FIG. 4, such as when the UE is configured to transmit the SR processable as a WUS during every Xth PUCCH occasion, where X is a positive integer. As described with reference to FIG. 4. X had a value of 4—e.g., X corresponded to a fourth PUCCH occasion 408.

In some implementations, the SR is configured to be processed based on an NES state of the network entity. For example, the SR may be configured to be processed as the WUS based on the NES state of the network entity being a low energy NES state, a request for an uplink resource based on the NES state of the network entity being a default operating NES state, or a request to transmit an SIB1 based on the NES state of the network entity being an SIB1-less state. The low energy NES state may include or correspond to an inactive state of the network entity, and the default operating NES may include or correspond to an active state of the network entity. Additionally, the UE may transmit the SR according to PUCCH format 1, 2, 3, or 4.

In some implementations, the SR includes one or more bits. For example, a multi-bit implementation of the SR, such as an five bit implementation of the SR, may indicate a request to allocate a UL resource grant, switch from a low-energy NES state to a high-energy NES state or from a high-energy NES state to a low-energy NES state, activate one or more CCs, initiate an SSB transmission, or initiate an SIB1 transmission. For example, a UE may be configured to generate a multi-bit SR by selecting different phase offsets of a same ZC sequence. In particular, these different phase offsets may be implemented via different cyclic shifts for each codepoint among a plurality of codepoints. To illustrate, the UE may be configured to generate a plurality of cyclic shifts and may thereafter select a cyclic shift from among the plurality of cyclic shifts. The selected cyclic shift may include or correspond to a ZC sequence configurable to multiplex the plurality of bits on a PUCCH. For example, the UE may be configured to multiplex the plurality of bits on a physical uplink control channel (PUCCH) based on a cyclic shift that corresponds to a Zadoff-Chu (ZC) sequence.

In some implementations, prior to generating the SR, the UE may receive a configuration message that indicates that the SR is configurable to be processed as the WUS, and the UE may be configured to generate the SR based on the configuration message. For example and referring to FIG. 3, network entity 305 may generate configuration message 370 and may transmit configuration message 370 to UE 115. The configuration message may include information, such as SR information 306, instructions, or both to facilitate generation, by UE 115, of SR 372 that is processable as a WUS.

In some implementations, the configuration message may be included in RRC such that receipt, by the UE, of the configuration message includes receipt, by the UE, of a RRC message that includes the configuration message. Additionally, the configuration message may indicate a PUCCH configuration via which the SR is to be transmitted. In some implementations, the configuration message may include or correspond to a PUCCH-Config message or a PUCCH-ConfigCommon message.

In some implementations, the mechanism by which the UE receives the configuration message may depend upon whether the UE is in a connected mode (e.g., a high energy NES state) or a disconnected mode (e.g., a low energy NES state). For instance, in response to the UE being in a connected mode, the configuration message may be included in a RRC message. Conversely, in response to the UE being in a low energy state, the configuration message may be broadcasted in an SIB1 message.

In some implementations, the UE may be configured to transmit a hybrid automatic repeat request acknowledgement (HARQ-ACK) bit to the network entity on a first PUCCH. Accordingly, the UE, configured to transmit the SR, may include the UE further configured to transmit the SR on the first PUCCH or on a second PUCCH. Therefore, the configuration message, such as configuration message 370, may include a priority indicator that indicates a first priority with which the SR is to be transmitted and a second priority with which the HARQ-ACK bit is to be transmitted. For instance, the first priority may be distinct from the second priority, and PUCCH resources may be allocated based on the first priority and the second priority. To elaborate, the priority indicator may include L1 signaling, L2 signaling, or L3 signaling. The first priority may denote a first quantity of PUCCH resources allocated for transmission of the SR, and the second priority may denote a second quantity of PUCCH resources allocated for transmission of the HARQ-ACK bit, or a combination thereof. In the foregoing case, the first priority may be a lower priority than the second priority, and the UE may be configured to transmit the SR on the second PUCCH after transmission of the HARQ-ACK bit on the second PUCCH. Additionally, the second PUCCH may be distinct from the first PUCCH. Alternatively, the first priority may be a higher priority than the second priority, and, consequently, a larger block of frequency and time resources may be allocated for transmission of the SR than are allocated for transmission of the HARQ-ACK bit.

In some implementations, the first PUCCH and the second PUCCH may be indistinct, and the UE may further be configured to multiplex the HARQ-ACK bit and the SR. In the foregoing scenario, the UE configured to multiplex the HARQ-ACK bit and the SR may further include the UE configured to multiplex the HARQ-ACK bit and the SR prior to encoding or after encoding. If the UE were to multiplex the SR and the HARQ-ACK bit prior to encoding, the UE may further be configured to combine the SR and HARQ-ACK bit, jointly encoding the SR and HARQ-ACK bit, and assign the jointly encoded SR and HARQ-ACK bit to PUCCH resources. If the UE were to multiplex the SR and the HARQ-ACK bit prior to encoding, the UE may further be configured to encode the SR, encode the HARQ-ACK bit independently of the encoded SR, and assign PUCCH resources to the encoded HARQ-ACK bit and to the encoded SR.

Figure 8:
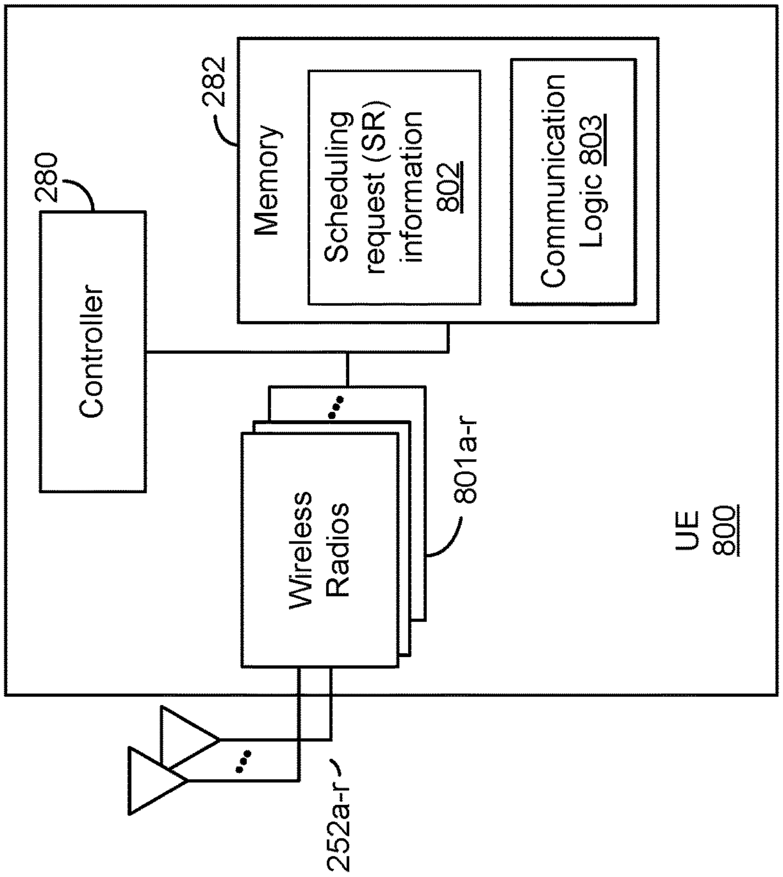
FIG. 8 is a block diagram of an example UE that supports adaptive processing of an SR as a WUS according to one or more aspects.

FIG. 8 is a block diagram of an example UE 800 that supports adaptive processing of an SR as a WUS according to one or more aspects. UE 800 may be configured to perform operations, including the blocks of a process described with reference to FIG. 7. In some implementations, UE 800 includes the structure, hardware, and components shown and described with reference to UE 115 of FIGS. 1-3. For example, UE 800 includes controller 280, which operates to execute logic or computer instructions stored in memory 282, as well as controlling the components of UE 800 that provide the features and functionality of UE 800. UE 800, under control of controller 280, transmits and receives signals via wireless radios 801_a-r_ and antennas 252_a-r_. Wireless radios 801_a-r_ include various components and hardware, as illustrated in FIG. 2 for UE 115, including modulator and demodulators 254_a-r_, MIMO detector 256, receive processor 258, transmit processor 264, and TX MIMO processor 266.

Figure 10:
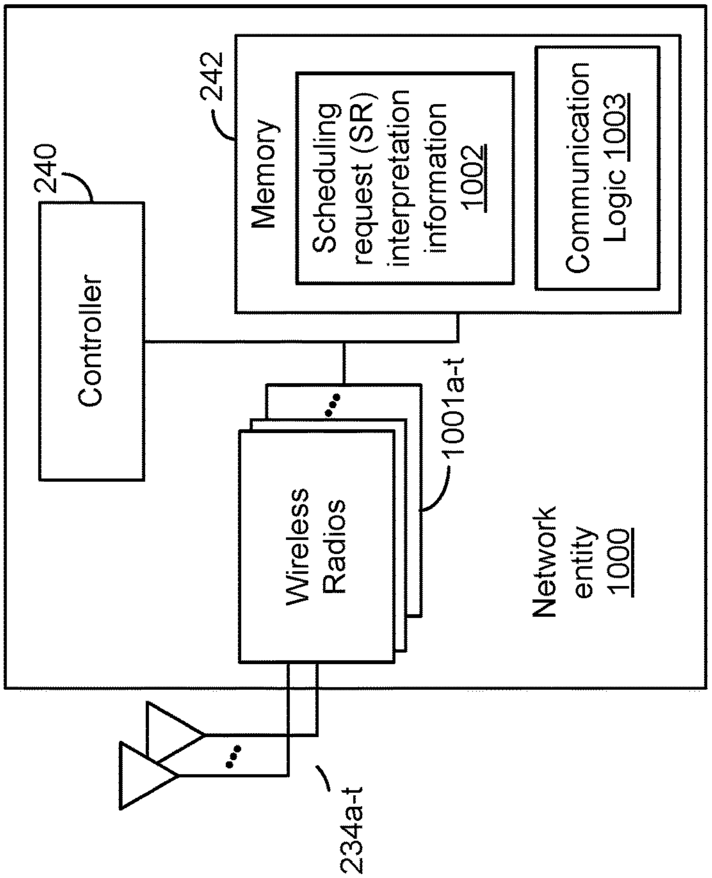
FIG. 10 is a block diagram of an example base station that supports adaptive processing of an SR as a WUS according to one or more aspects.

As shown, memory 282 may include SR information 802 and communication logic 803. SR information 802 may include or correspond to SR information 603. Communication logic 803 may be configured to enable communication between UE 800 and one or more other devices. UE 800 may receive signals from or transmit signals to one or more network entities, such as base station 105 of FIGS. 1-2, network entity 305 of FIG. 3, or a network entity as illustrated in FIG. 10.

Figure 9:
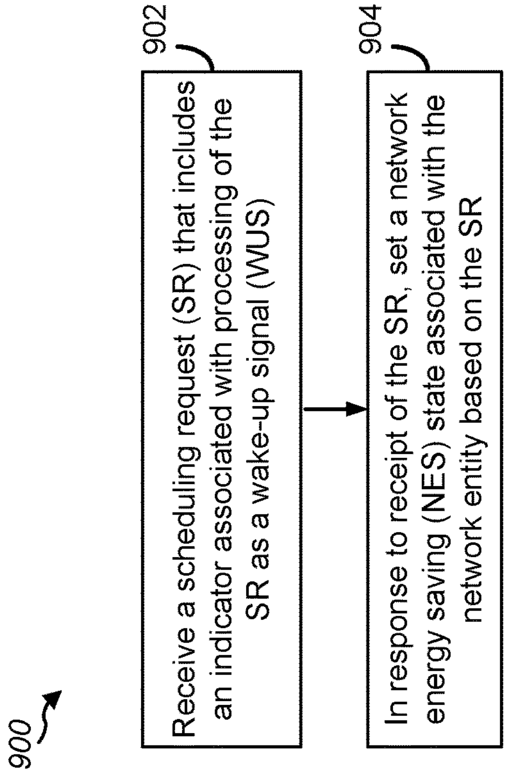
FIG. 9 is a flow diagram illustrating an example process that supports adaptive processing of an SR as a WUS according to one or more aspects.

FIG. 9 is a flow diagram illustrating an example process 900 that supports adaptive processing of an SR as a WUS according to one or more aspects. Operations of process 900 may be performed by a base station, such as base station 105 described above with reference to FIGS. 1-2, a network entity 305 described above with reference to FIG. 3, a network entity as described below with reference to FIG. 10, or any combination thereof. For example, example operations of process 900 may enable base station 105, network entity 305, or combinations thereof to support adaptive processing of an SR as a WUS.

At block 902, the network entity receives an SR that includes an indicator associated with processing of the SR as a WUS. The SR may include or correspond to SR 372. In some implementations, the SR may be received from a UE, such as UE 115. In implementations, a processor of the network entity receives the SR by, for example, causing a communication interface that is communicatively coupled to the processor to receive the SR.

At block 904, in response to receipt of the SR, the network entity sets a NES state associated with the network entity. Setting the NES state associated with the network entity may include changing, adjusting, or configuring the NES state, as illustrative, non-limiting examples. In some implementations, the network entity is further configured to process the SR based on SR processing information 364 or 664. For example, the network entity is further configured to process the SR based on a state of the network entity, such as explained with reference to FIG. 5. For example, the network entity may further be configured to process the SR based on the NES state associated with the network entity so that, in response to the NES state of the network entity being in a low energy NES state, corresponding to an inactive state, the SR is processed, by the network entity, as the WUS. Conversely, in response to the network entity being in a default operating NES state, corresponding to an active state, the network entity may further be configured to process the SR as an indication of a request, by the UE, for an uplink resources to transmit data to the network entity. Additionally, in response to the network entity being in an SIB1-less state, the SR is processed, by the network entity, as a request, by the UE to the network entity, to transmit SIB1

In some implementations, the network entity generates a configuration message operable to cause a UE to configure the scheduling request to function as the WUS. For example, the configuration message may include or correspond to configuration message 370. The configuration message may include a priority indicator indicating a priority with which the configured SR is to be transmitted, a cyclic shift indicator indicating a cyclic shift associated with a ZC sequence for generation of a multi-bit configured SR, or a combination thereof. The network entity may transmit the configuration message to the UE. The manner in which the network entity transmits the configuration message may depend on a state of the UE, such as whether the UE is in a connected state or mode (e.g., a high energy state) or whether the UE is in a disconnected state or mode (e.g., a low energy state). For instance, in response to the UE being in a connected mode, transmitting the configuration message may include transmitting the configuration message in a radio resource control (RRC) message. Conversely, in response to the UE being in a low energy state, transmitting the configuration message may include broadcasting the configuration message in an SIB1 message.

In some implementations, in response to receipt of the SR, such as from the UE, the network entity may be configured to transmit an SSB, transmit an SIB1, allocate a UL resource grant to the UE, or a combination thereof.

In some implementations, the NES state is a low energy state corresponding to an inactive state or a high energy state corresponding to an active state. Additionally, setting, by the network entity, the NES state associated with the network entity may include changing the NES state from the low energy state to the high energy state or to the high energy state to the lower energy state. In some implementations, setting the NES state includes changing the NES state instead of allocating resources to a UE for a PUCCH.

In some implementations, the network entity configured to receive the SR further includes the network entity configured to periodically receive the SR in a PUCCH occasion, such as explained with reference to FIG. 4. The network entity may be configured to process the SR as the WUS based on receiving the SR in the PUCCH occasion. Additionally, the network entity may be configured to receive a plurality of PUCCH occasions, in addition to the PUCCH occasion. Each of the plurality of PUCCH occasions may include a second SR that is configured to indicate, to the network entity, that the UE has data available to transmit and to request a UL resource, from the network entity, to transmit the data.

In some implementations, the configuration message includes a priority indicator indicting a first priority with which the configured SR is to be transmitted and a second priority with which a HARQ-ACK bit is to be transmitted. The priority indicator may indicate a quantity of PUCCH resources allocable to transmission of the configured SR and to the HARQ-ACK bit, respectively.

In some implementations, the SR includes a plurality of bits. Each bit of the plurality of bits may indicate, to the network entity, a request, by a UE, to allocate, to a UE, a UL resource grant, to switch from a low-energy NES state to a high-energy NES state or from a high-energy NES state to a low-energy NES state, to activate one or more CCs, or an combination thereof. Additionally, each bit of the plurality of bits may indicate, to the network entity, a request, by a UE, to initiate an SSB transmission, or initiate an SIB1 transmission.

In some implementations, the network entity is further configured to transmit a configuration message operable to cause a UE to configure the scheduling request to function as the WUS. The configuration message may include indicators of a plurality of cyclic shifts. Each cyclic shift of the plurality of cyclic shifts may correspond to a Zadoff-Chu sequence. For example, each cyclic shift of the plurality of cyclic shifts may correspond to a different Zadoff-Chu sequence of multiple Zadoff-Chu sequences. The UE may be configurable to generate the plurality of bits based on a cyclic shift selected from among the plurality of cyclic shifts.

FIG. 10 is a block diagram of an example network entity 1000 that supports adaptive processing of an SR as a WUS according to one or more aspects. Network entity 1000 may be configured to perform operations, including the blocks of process 900 described with reference to FIG. 9. In some implementations, network entity 1000 includes the structure, hardware, and components shown and described with reference to base station 105 of FIGS. 1-2, network entity 305 of FIG. 3, or any combination thereof. For example, network entity 1000 may include controller 240, which operates to execute logic or computer instructions stored in memory 242, as well as controlling the components of network entity 1000 that provide the features and functionality of network entity 1000. Network entity 1000, under control of controller 240, transmits and receives signals via wireless radios 1001*a-t* and antennas 234*a-t*. Wireless radios 1001*a-t* include various components and hardware, as illustrated in FIG. 2, including modulator and demodulators 232*a-t*, transmit processor 220, TX MIMO processor 230, MIMO detector 236, and receive processor 238.

As shown, the memory 242 may include SR processing information 1002 and communication logic 1003. SR processing Information 1002 may include or correspond to SR processing information 364. Communication logic 1003 may be configured to enable communication between network entity 1000 and one or more other devices. Network entity 1000 may receive signals from or transmit signals to one or more UEs, such as UE 115 of FIGS. 1-3 or UE 800 of FIG. 8.

It is noted that one or more blocks (or operations) described with reference to FIGS. 7 and 9 may be combined with one or more blocks (or operations) described with reference to another of the figures. For example, one or more blocks (or operations) of FIG. 7 may be combined with one or more blocks (or operations) of FIG. 9. As another example, one or more blocks associated with FIGS. 7 and 9 may be combined with one or more blocks (or operations) associated with FIGS. 1-6. Additionally, or alternatively, one or more operations described above with reference to FIGS. 1-6 may be combined with one or more operations described with reference to FIG. 8 or 10.

In one or more aspects, techniques for supporting processing of an SR as a WUS may include additional aspects, such as any single aspect or any combination of aspects described below or in connection with one or more other processes or devices described elsewhere herein. In a first aspect, techniques for supporting processing of an SR as a WUS may include generating an SR that includes an indicator associated with processing of the SR as a WUS. The techniques may further include transmitting the SR to a network entity. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. In aspects, a processor may transmit or receive the SR by causing the interface to transmit or receive the SR. Additionally, or alternatively, the wireless communication device may include one or more means configured to perform operations described herein.

In a second aspect, in combination with the first aspect, the SR indicates a request for the network entity to change an NES state, a request for the network entity to transmit an SSB, a request for the network entity to transmit an SIB1, a UL resource grant request from the network entity, or a combination thereof.

In a third aspect, in combination with the first aspect, the SR indicates a request for the network entity to change a network energy saving (NES) state, and the NES state is a low energy state corresponding to an inactive state or a high energy state corresponding to an active state.

In a fourth aspect, in combination with one or more of the first aspect through the third aspect, transmitting the SR to the network entity includes transmitting a first PUCCH occasion that includes the SR.

In a fifth aspect in combination with the fourth aspect, the techniques further include transmitting multiple PUCCH occasions that include the first PUCCH occasion and a second PUCCH occasion.

In a sixth aspect, in combination with the fifth aspect, the second PUCCH occasion includes another SR that is configured to request a UL resource for transmission of data.

In a seventh aspect, in combination with the fifth aspect or the sixth aspect, to transmit the SR in the first PUCCH occasion, the techniques further include transmitting the SR periodically.

In an eighth aspect, in combination with one or more of the first aspect through the seventh aspect, the SR is configured to be processed based on an NES state of the network entity.

In a ninth aspect, in combination with the eighth aspect, the SR is configured to be processed as: the WUS based on the NES state of the network entity being a low energy NES state.

In a tenth aspect, in combination with the ninth aspect, the SR is configured to be processed as a request for an uplink resource based on the NES state of the network entity being a default operating NES state.

In an eleventh aspect, in combination with the tenth aspect, the SR is configured to be processed as a request to transmit an SIB1 based on the NES state of the network entity being an SIB1-less state.

In a twelfth aspect, in combination with one or more of the ninth aspect through the eleventh aspect, the low energy NES state corresponds to an inactive state of the network entity, and the default operating NES corresponds to an active state of the network entity.

In a thirteenth aspect, in combination with one or more of the first aspect through the twelfth aspect, the SR includes one or more bits that indicate a request to allocate a UL resource grant.

In a fourteenth aspect, in combination with the thirteenth aspect, the SR includes one or more bits that indicate a request to switch from a low-energy NES state to a high-energy NES state or from a high-energy NES state to a low-energy NES state.

In a fifteenth aspect, in combination with the thirteenth aspect, the SR includes one or more bits that indicate a request to activate one or more CCs.

In a sixteenth aspect, in combination with the thirteenth aspect, the SR includes one or more bits that indicate a request to initiate an SSB transmission.

In a seventeenth aspect, in combination with the thirteenth aspect, the SR includes one or more bits that indicate a request to initiate an SIB1 transmission.

In an eighteenth aspect, in combination with one or more of the thirteenth aspect through the seventeenth aspect, the one or more bits include a plurality of bits, the plurality of bits multiplexed on a physical uplink control channel (PUCCH) based on a cyclic shift that corresponds to a Zadoff-Chu (ZC) sequence.

In a nineteenth aspect, in combination with the eighteenth aspect, the different phase offsets are implemented via different cyclic shifts for each codepoint among a plurality of codepoints.

In a twentieth aspect, in combination with one or more of the thirteenth aspect through the seventeenth aspect, the techniques further include generating a plurality of cyclic shifts.

In a twenty-first aspect, in combination with the twentieth aspect, the techniques further include selecting a cyclic shift from the plurality of cyclic shifts, the selected cyclic shift corresponds to a specific ZC sequence configurable to multiplex the plurality of bits on a PUCCH.

In a twenty-second aspect, in combination with one or more of the first aspect through the twenty-first aspect, the techniques further include, prior to generating the SR, receiving a configuration message that indicates that the SR is configurable to be processed as the WUS.

In a twenty-third aspect, in combination with the twenty-second aspect, the SR is generated based on the configuration message.

In a twenty-fourth aspect, in combination with the twenty-second aspect or the twenty-third aspect, the techniques further include transmitting an HARQ-ACK bit to the network entity on a first PUCCH.

In a twenty-fifth aspect, in combination with the twenty-fourth aspect, the configuration message includes a priority indicator that indicates a first priority with which the SR is to be transmitted and a second priority with which the HARQ-ACK bit is to be transmitted.

In a twenty-sixth aspect, in combination with the twenty-fifth aspect, transmitting the SR includes transmitting the SR on a first PUCCH or on a second PUCCH.

In a twenty-seventh aspect, in combination with the twenty-sixth aspect, the second PUCCH is distinct from the first PUCCH, the priority indicator includes L1 signaling, L2 signaling, or L3 signaling, the first priority denotes a first quantity of PUCCH resources allocated for transmission of the SR, the second priority denotes a second quantity of PUCCH resources allocated for transmission of the HARQ-ACK bit, or a combination thereof.

In a twenty-eighth aspect, in combination with the twenty-sixth aspect, the first priority is a lower priority than the second priority.

In a twenty-ninth aspect, in combination with the twenty-eighth aspect, the SR is transmitted on the second PUCCH after transmission of the HARQ-ACK bit on the second PUCCH.

In a thirtieth aspect, in combination with the twenty-sixth aspect, the techniques further include multiplexing the HARQ-ACK bit and the SR, wherein the first PUCCH and the second PUCCH are indistinct.

In a thirty-first aspect, in combination with the thirtieth aspect, to multiplex the HARQ-ACK bit and the SR, the techniques further include multiplexing the HARQ-ACK bit and the SR prior to encoding or after encoding.

In a thirty-second aspect, in combination with the thirtieth aspect, to multiplex the SR and the HARQ-ACK bit prior to encoding, the techniques further include combining the SR and HARQ-ACK bit, jointly encoding the SR and HARQ-ACK bit, and assigning the jointly encoded SR and HARQ-ACK bit to PUCCH resources.

In a thirty-third aspect, in combination with the thirtieth aspect, to multiplex the SR and the HARQ-ACK bit prior to encoding, the techniques further include encoding the SR, encoding the HARQ-ACK bit independently of the encoded SR, and assigning PUCCH resources to the encoded HARQ-ACK bit and to the encoded SR.

In a thirty-fourth aspect, in combination with the thirtieth aspect, the first priority is distinct from the second priority, and wherein PUCCH resources are allocated based on the first priority and the second priority.

In a thirty-fifth aspect, in combination with the twenty-second aspect or the twenty-third aspect, to receive the configuration message, the techniques further include receiving an RRC message that includes the configuration message.

In a thirty-sixth aspect, in combination with the thirty-fifth aspect, the configuration message indicates a PUCCH configuration via which the SR is to be transmitted.

In a thirty-seventh aspect, in combination with the thirty-fifth aspect, the configuration message corresponds to a PUCCH-Config message or a PUCCH-ConfigCommon message.

In a thirty-eighth aspect, in combination with the twenty-second aspect or the twenty-third aspect, in response to the UE being in a connected mode, the configuration message is included in a RRC message.

In a thirty-ninth aspect, in combination with the twenty-second aspect or the twenty-third aspect, in response to the UE being in a low energy state, the configuration message is broadcasted in an SIB1 message.

In a fortieth aspect, in combination with one or more of the seventeenth aspect through the thirty-ninth aspect, the SR is transmitted according to a PUCCH format 1, 2, 3, or 4.

In one or more aspects, techniques for supporting processing of an SR as a WUS may include additional aspects, such as any single aspect or any combination of aspects described below or in connection with one or more other processes or devices described elsewhere herein. In a forty-first aspect, techniques for supporting processing of an SR as a WUS may include receiving an SR that includes an indicator associated with processing of the SR as a WUS. The techniques may further include, in response to receipt of the SR, setting an NES state associated with the network entity based on the SR. In some examples, the techniques in the forty-first aspect may be implemented in a method or process. In some other examples, the techniques of the forty-first aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a forty-second aspect, in combination with the forty-first aspect, the techniques further include generating a configuration message operable to cause a UE to configure the scheduling request to function as the WUS.

In a forty-third aspect, in combination with the forty-second aspect, the configuration message includes a priority indicator indicating a priority with which the configured SR is to be transmitted, a cyclic shift indicator indicating a cyclic shift associated with a ZC sequence for generation of a multi-bit configured SR, or a combination thereof.

In a forty-fourth aspect, in combination with the forty-second aspect or the forty-third aspect, the techniques further include transmitting the configuration message to the UE.

In a forty-fifth aspect, in combination with one or more of the forty-second aspect through the forty-fourth aspect, the configuration message includes a priority indicator indicting a first priority with which the configured SR is to be transmitted and a second priority with which a HARQ-ACK bit is to be transmitted.

In a forty-sixth aspect, in combination with the forty-fifth aspect, the priority indicator indicates first PUCCH resources allocable to transmission of the configured SR and second PUCCH resources allocable to the HARQ-ACK bit.

In a forty-seventh aspect, in combination with one or more of the forty-second aspect through the forty-fourth aspect, to transmit the configuration message, the techniques further include, in response to the UE being in a connected mode, transmitting the configuration message includes transmitting the configuration message in an RRC message.

In a forty-eighth aspect, in combination with of the forty-second aspect or the forty-third aspect, to transmit the configuration message, the techniques further include, in response to the UE being in a low energy state, transmitting the configuration message includes broadcasting the configuration message in an SIB1 message.

In a forty-ninth aspect, in combination with one or more of the forty-first aspect through the forty-eighth aspect, the techniques further include, based on the SR, transmitting an SSB, transmitting an SIB1, allocating a UL resource grant to a UE, or a combination thereof.

In a fiftieth aspect, in combination with one or more of the forty-first aspect through the forty-ninth aspect, the NES state is a low energy state corresponding to an inactive state or a high energy state corresponding to an active state.

In a fifty-first aspect, in combination with the fiftieth aspect, to set the NES state associated with the network entity, the techniques further include changing the NES state from the low energy state to the high energy state or from to the high energy state to the lower energy state.

In a fifty-second aspect, in combination with one or more of the forty-first aspect through the fifty-first aspect, to set the NES state, the techniques further include changing the NES state instead of allocating resources to a UE for a PUCCH.

In a fifty-third aspect, in combination with one or more of the forty-first aspect through the fifty-second aspect, to receive the SR, the techniques further include periodically receiving the SR in a PUCCH occasion.

In a fifty-fourth aspect, in combination with the fifty-third aspect, the network entity is configured to process the SR as the WUS based on receiving the SR in the PUCCH occasion.

In a fifty-fifth aspect, in combination with the fifty-third aspect or the fifty-fourth aspect, the techniques further include receiving a plurality of PUCCH occasions.

In a fifty-sixth aspect, in combination with the fifty-fifth aspect, the plurality of PUCCH occasions do not include the PUCCH occasion.

In a fifty-seventh aspect, in combination with the fifty-fifth aspect or the fifty-sixth aspect, each of the plurality of PUCCH occasions includes a second SR that is configured to indicate, to the network entity, that a UE has data available to transmit and to request a UL, from the network entity, to transmit the data.

In a fifty-eighth aspect, in combination with one or more of the forty-first aspect through the fifty-seventh aspect, the techniques further include processing the SR based on the NES state associated with the network entity.

In a fifty-ninth aspect, in combination with the fifty-eighth aspect, in response to the NES state of the network entity being in a low energy NES state, corresponding to an inactive state, the SR is processed, by the network entity, as the WUS.

In a sixtieth aspect, in combination with the fifty-eighth aspect, in response to the NES state of the network entity being in a default operating NES state, corresponding to an active state, the SR is processed, by the network entity, as an indication of a request, by a UE, for an uplink resources to transmit data to the network entity.

In a sixty-first aspect, in combination with the fifty-eighth aspect, in response to the NES state of the network entity being in an SIB1-less state, the SR is processed, by the network entity, as a request, by the UE to the network entity, to transmit SIB1.

In a sixty-second aspect, in combination with one or more of the forty-first aspect through the sixty-first aspect, the SR includes a plurality of bits.

In a sixty-third aspect, in combination with the sixty-second aspect, each bit of the plurality of bits indicates, to the network entity, a request to allocate, to a UE, a UL resource grant.

In a sixty-fourth aspect, in combination with the sixty-second aspect, each bit of the plurality of bits indicates, to the network entity, a request to switch from a low-energy NES state to a high-energy NES state or from a high-energy NES state to a low-energy NES state.

In a sixty-fifth aspect, in combination with the sixty-second aspect, each bit of the plurality of bits indicates, to the network entity, a request to activate one or more CCs.

In a sixty-sixth aspect, in combination with the sixty-second aspect, each bit of the plurality of bits indicates, to the network entity, a request to initiate an SSB transmission.

In a sixty-seventh aspect, in combination with the sixty-second aspect, each bit of the plurality of bits indicates, to the network entity, a request to initiate an SIB1 transmission.

In a sixty-eighth aspect, in combination with one or more of the sixty-second aspect through the sixty-seventh aspect, the techniques further include transmitting a configuration message operable to cause a UE to configure the scheduling request to function as the WUS.

In a sixty-ninth aspect, in combination with the sixty-eighth aspect, the configuration message includes indicators of a plurality of cyclic shifts, each cyclic shift of the plurality of cyclic shifts corresponding to a specific Zadoff-Chu sequence.

In a seventieth aspect, in combination with the sixty-ninth aspect, the UE is configurable to generate the plurality of bits based on a cyclic shift selected from among the plurality of cyclic shifts.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent. As used herein, the term "based on" means based "only on" and "based, at least in part, on".

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method including:

generating a scheduling request (SR) that includes an indicator associated with processing of the SR as a wake-up signal (WUS), wherein the SR indicates a request for a network entity to change a network energy saving (NES) state from a high-energy NES state to a low-energy NES state; and transmitting the SR to the network entity.

2. The method of claim 1, wherein the SR indicates:

a request for the network entity to transmit a synchronization signal block (SSB);

a request for the network entity to transmit a system information block type 1 (SIB1); and an uplink (UL) resource grant request from the network entity.

3. The method of claim 1, wherein:

the high-energy NES state corresponds to an active state; and transmitting the SR to the network entity includes transmitting a first physical uplink control channel (PUCCH) occasion that includes the SR.

4. The method of claim 3, wherein transmitting the SR in the first PUCCH occasion includes transmitting the SR periodically, the method further comprising:

transmitting multiple PUCCH occasions, the multiple PUCCH occasions including the first PUCCH occasion and a second PUCCH occasion, wherein the second PUCCH occasion includes another SR that is configured to request an uplink (UL) resource for transmission of data.

5. The method of claim 1, wherein the SR is configured to be processed as:

a request for an uplink resource based on the NES state of the network entity being a default operating NES state and a request to transmit system information block type 1 (SIB1) based on the NES state of the network entity being an SIB1-less state.

6. The method of claim 1, wherein the SR includes one or more bits that indicate a request to:

allocate an uplink (UL) resource grant;

activate one or more component carriers (CCs);

initiate a synchronized signal block (SSB) transmission; and initiate a system information block type 1 (SIB1) transmission.

7. The method of claim 6, wherein the one or more bits include a plurality of bits, the method further comprising:

multiplexing the plurality of bits on a physical uplink control channel (PUCCH) based on a cyclic shift that corresponds to a Zadoff-Chu (ZC) sequence.

8. An apparatus for wireless communication, the apparatus including:

at least one processor; and a memory coupled to the at least one processor, wherein the at least one processor is configured to:

generate a scheduling request (SR) that includes an indicator associated with processing of the SR as a wake-up signal (WUS), wherein the SR indicates a request for a network entity to change a network energy saving (NES) state from a high-energy NES state to a low-energy NES state; and transmit the SR to the network entity.

9. The apparatus of claim 8, wherein the SR indicates:

a request for the network entity to transmit a synchronization signal block (SSB);

a request for the network entity to transmit a system information block type 1 (SIB1); and an uplink (UL) resource grant request from the network entity.

10. The apparatus of claim 8, wherein:

the high-energy NES state corresponds to an active state; and to transmit the SR to the network entity, the at least one processor is configured to transmit a first physical uplink control channel (PUCCH) occasion that includes the SR.

11. The apparatus of claim 10, wherein, to transmit the SR to the network entity in the first PUCCH occasion that includes the SR, the at least one processor is configured to transmit the SR periodically, and wherein the at least one processor is further configured to:

transmit multiple PUCCH occasions, the multiple PUCCH occasions including the first PUCCH occasion and a second PUCCH occasion, wherein the second PUCCH occasion includes another SR that is configured to request an uplink (UL) resource for transmission of data.

12. The apparatus of claim 8, wherein the SR is configured to be processed as:

a request for an uplink resource based on the NES state of the network entity being a default operating NES state and a request to transmit system information block type 1 (SIB1) based on the NES state of the network entity being an SIB1-less state.

13. The apparatus of claim 8, wherein the SR includes one or more bits that indicate a request to:

allocate an uplink (UL) resource grant;

activate one or more component carriers (CCs);

initiate a synchronized signal block (SSB) transmission; and initiate a system information block type 1 (SIB1) transmission.

14. The apparatus of claim 13, wherein the one or more bits include a plurality of bits, and wherein the at least one processor is further configured to:

multiplex the plurality of bits on a physical uplink control channel (PUCCH) based on a cyclic shift that corresponds to a Zadoff-Chu (ZC) sequence.

15. A method of wireless communication performed by a network entity, the method including:

receiving a scheduling request (SR) that includes an indicator associated with processing of the SR as a wake-up signal (WUS); and setting a network energy saving (NES) state associated with the network entity based on the SR, wherein the SR indicates a request for a network entity to change the NES state from a high-energy NES state to a low-energy NES state.

16. The method of claim 15, wherein:

high-energy NES state corresponds to an active state.

17. The method of claim 15, further comprising, based on the SR:

transmitting a synchronization signal block (SSB);

transmitting a system information block type 1 (SIB1); and allocating an uplink (UL) resource grant to a user equipment (UE).

18. The method of claim 15, wherein setting the NES state includes changing the NES state instead of allocating resources to a user equipment (UE) for a physical uplink control channel (PUCCH).

19. The method of claim 15, wherein receiving the SR includes periodically receiving the SR in a physical uplink control channel (PUCCH) occasion, and wherein the network entity is configured to process the SR as the WUS based on receiving the SR in the PUCCH occasion.

20. The method of claim 19, further comprising:

receiving a plurality of PUCCH occasions, in addition to the PUCCH occasion, wherein each of the plurality of PUCCH occasions includes a second SR that is configured to indicate, to the network entity, that a user equipment (UE) has data available to transmit and to request an uplink (UL) resource, from the network entity, to transmit the data.

21. The method of claim 15, wherein, in response to the NES state of the network entity being:

in a default operating NES state, corresponding to an active state, the SR is processed, by the network entity, as an indication of a request, by a user equipment (UE), for an uplink resources to transmit data to the network entity, or in a system information block type 1 (SIB1)-less state, the SR is processed, by the network entity, as a request, by the UE to the network entity, to transmit SIB1.

22. The method of claim 15, wherein:

the SR includes a plurality of bits, and each bit of the plurality of bits indicates, to the network entity, a request to:

allocate, to a user equipment (UE), an uplink (UL) resource grant;

switch from the high-energy NES state to the low-energy NES state;

activate one or more component carriers (CCs);

initiate a synchronized signal block (SSB) transmission; and initiate a system information block type 1 (SIB1) transmission.

23. The method of claim 22, further comprising:

transmitting a configuration message operable to cause a user equipment (UE) to configure the scheduling request to function as the WUS, wherein:

the configuration message includes indicators of a plurality of cyclic shifts, each cyclic shift of the plurality of cyclic shifts corresponding to a Zadoff-Chu sequence; and the UE is configurable to generate the plurality of bits based on a cyclic shift selected from among the plurality of cyclic shifts.

24. An apparatus for wireless communication, the apparatus including:

at least one processor; and a memory coupled to the at least one processor, wherein the at least one processor is configured to:

receive a scheduling request (SR) that includes an indicator associated with processing of the SR as a wake-up signal (WUS); and in response to receipt of the SR, set a network energy saving (NES) state associated with a network entity based on the SR, wherein the SR indicates a request for a network entity to change the NES state from a high-energy NES state to a low-energy NES state.

25. The apparatus of claim 24, wherein;

the high-energy NES state corresponds to an active state.

26. The apparatus of claim 24, wherein, in response to receipt of the SR, the at least one processor is further configured to:

transmit a synchronization signal block (SSB);

transmit a system information block type 1 (SIB1); and
allocate an uplink (UL) resource grant to a user equipment (UE).

27. The apparatus of claim 24, wherein, to set the NES state, the at least one processor is configured to set the NES state instead of allocating resources to a user equipment (UE) for a physical uplink control channel (PUCCH).

28. The apparatus of claim 24, wherein, to receive the SR, the at least one processor is configured to periodically receive the SR in a physical uplink control channel (PUCCH) occasion.

29. The apparatus of claim 28, wherein the network entity is configured to process the SR as the WUS based on receipt of the SR in the PUCCH occasion.

* * * * *